United States Patent
Ou et al.

(10) Patent No.: US 6,676,170 B2
(45) Date of Patent: Jan. 13, 2004

(54) PIVOTABLE CONNECTOR FOR MANIPULATOR

(75) Inventors: Vincent Ou, Taipei (TW); PuPeng Hui, Shenzhen (CN); Galei Hu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/928,830

(22) Filed: Aug. 13, 2001

(65) Prior Publication Data

US 2002/0192013 A1 Dec. 19, 2002

(30) Foreign Application Priority Data

Jun. 13, 2001 (TW) .................................... 90209867 U

(51) Int. Cl.⁷ ................................................. F16L 27/00
(52) U.S. Cl. ........................ 285/281; 285/275; 285/273
(58) Field of Search ................................. 285/231, 272, 285/273, 275, 278, 281

(56) References Cited

U.S. PATENT DOCUMENTS

| | | | | |
|---|---|---|---|---|
| 2,698,664 A | * | 1/1955 | Freeman ................. | 285/275 X |
| 2,886,346 A | * | 5/1959 | Nixon ..................... | 285/272 |
| 3,411,526 A | * | 11/1968 | Schaefer ................. | 285/273 |
| 3,462,176 A | * | 8/1969 | Goodrum ................ | 285/281 X |
| 3,685,397 A | * | 8/1972 | Gooding, Jr. ........... | 285/273 |
| 4,763,693 A | * | 8/1988 | Valley ..................... | 285/275 |
| 5,713,609 A | * | 2/1998 | Mascola ................. | 285/281 X |
| 5,839,764 A | * | 11/1998 | Heidelberger .......... | 285/273 X |
| 6,070,917 A | * | 6/2000 | Wiebe ..................... | 285/272 |

* cited by examiner

Primary Examiner—David Bochna
(74) Attorney, Agent, or Firm—Wei Te Chung

(57) ABSTRACT

A connector includes a pivot portion (10), a sleeve (40) and a connect portion (60). The pivot portion includes a body (12) and a head (14). The body defines two channels (16), and two through holes (18) in respective communication with the channels. The head defines two outlets (20) and two bores (22). Each bore is in communication with a corresponding through hole and outlet. The sleeve surrounds the body and defines a plurality of inlets (42) in communication with the corresponding channels. The connect portion is attached under the pivot portion and engaged with a pivot axle of a manipulator. The sleeve is fixedly attached to a fixed part of the manipulator. When the combined pivot portion and the connect portion is pivoted by action of the pivot axle, the sleeve remains stationary. Pipes connected to the inlets are thereby prevented from being twisted or distorted by the manipulator.

9 Claims, 4 Drawing Sheets

PIVOTABLE CONNECTOR FOR MANIPULATOR

BACKGROUND OF THE INVENTION

1. Field of the Invention

The present invention relates to pivotable connectors for machine tools, and particularly to pivotable connectors for mechanical manipulators.

2. Prior Art

Manufacturing industry automation is developing rapidly and becoming highly sophisticated. Mechanical manipulators are now universal in most modem industries. Oftentimes, manipulator fingers are connected to manipulator axles with connectors.

FIG. 4 shows a conventional connector for a manipulator. The connector comprises a pivot portion 200 and a connect portion 300. The pivot portion 200 comprises a head 210 and a body 220. The head 210 defines a plurality of screw holes 212. Screws which extend from a clamp (not shown) of a manipulator finger (not shown) engage in the screw holes 212, thereby attaching the head 210 to the clamp. A pair of outlets 214 is defined in a circumferential surface of the head 210, extending radially inwardly toward a center of the head 210. A pair of bores 216 is defined through the head 210 and into the body 220. An upper portion of each bore 216 is in communication with a corresponding outlet 214. A pair of inlets 222 is defined in the body 220, extending radially inwardly toward a center of the body 220. Each inlet 222 is in communication with a lower portion of a corresponding bore 216. A pipe (not shown) is connected to each inlet 222, for conveying airflow into the inlet 222. The connect portion 300 comprises a base 310 and a position section 320. The base 310 defines a plurality of screw holes 312, for extension of screws (not shown) therethrough to engage with the body 220. A plurality of locking holes 314 is defined in the base 310, for extension of screws (not shown) therethrough to engage with an axle (not shown) of the manipulator. The connect portion 300 is thereby attached to the axle of the manipulator.

When the axle of the manipulator pivots and thereby causes the connector to pivot, the pipes are forced to twist and distort. After repeated and prolonged use, the pipes are prone to become weak and rupture.

SUMMARY OF THE INVENTION

Accordingly, an object of the present invention is to provide a connector which can prevent pipes of an associated manipulator from being twisted or distorted.

To achieve the above-mentioned object, a connector in accordance with the present invention comprises a pivot portion, a sleeve and a connect portion. The pivot portion comprises a body and a head. The body defines a pair of channels, and a pair of through holes each in communication with a corresponding channel. The head defines a pair of outlets and a pair of bores. Each bore is in communication with a corresponding through hole and outlet. The sleeve surrounds the body and defines a plurality of inlets in communication with the corresponding channels. The connect portion is attached under a bottom surface of the pivot portion and is engaged with a pivot axle of a manipulator. The sleeve is fixedly attached to a part of the manipulator which is fixed relative to the pivot axle. When the combined pivot portion and connect portion is pivoted by action of the pivot axle, the sleeve remains stationary relative to the pivot axle. Pipes connected to the inlets are thereby prevented from being twisted or distorted by the manipulator.

Other objects, advantages and novel features of the present invention will be drawn from the following detailed embodiment of the present invention with attached drawings, in which:

DESCRIPTION OF THE PREFERRED EMBODIMENT

Figure 1:
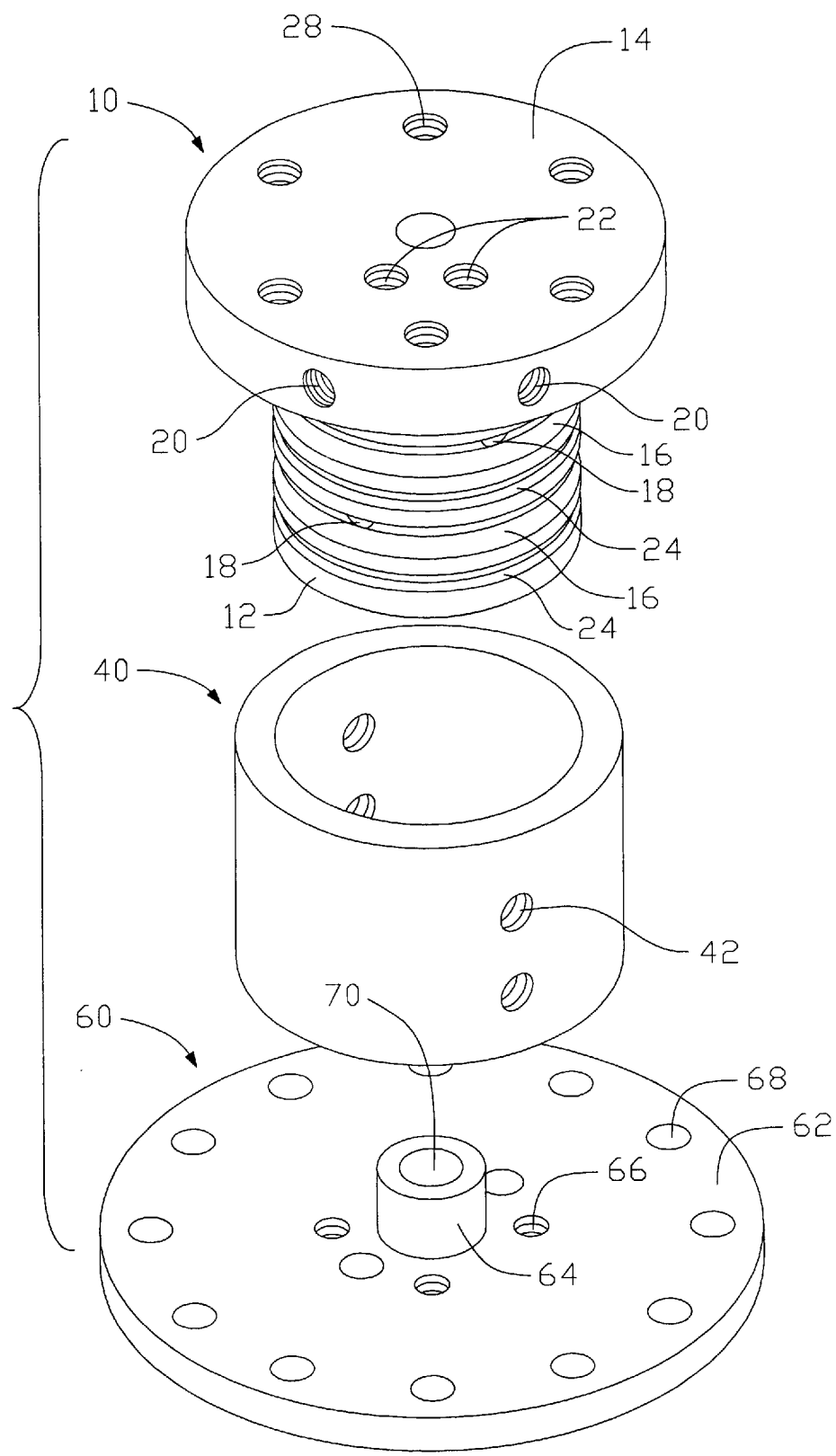
FIG. 1 is an exploded view of a connector of the present invention.
Figure 2:
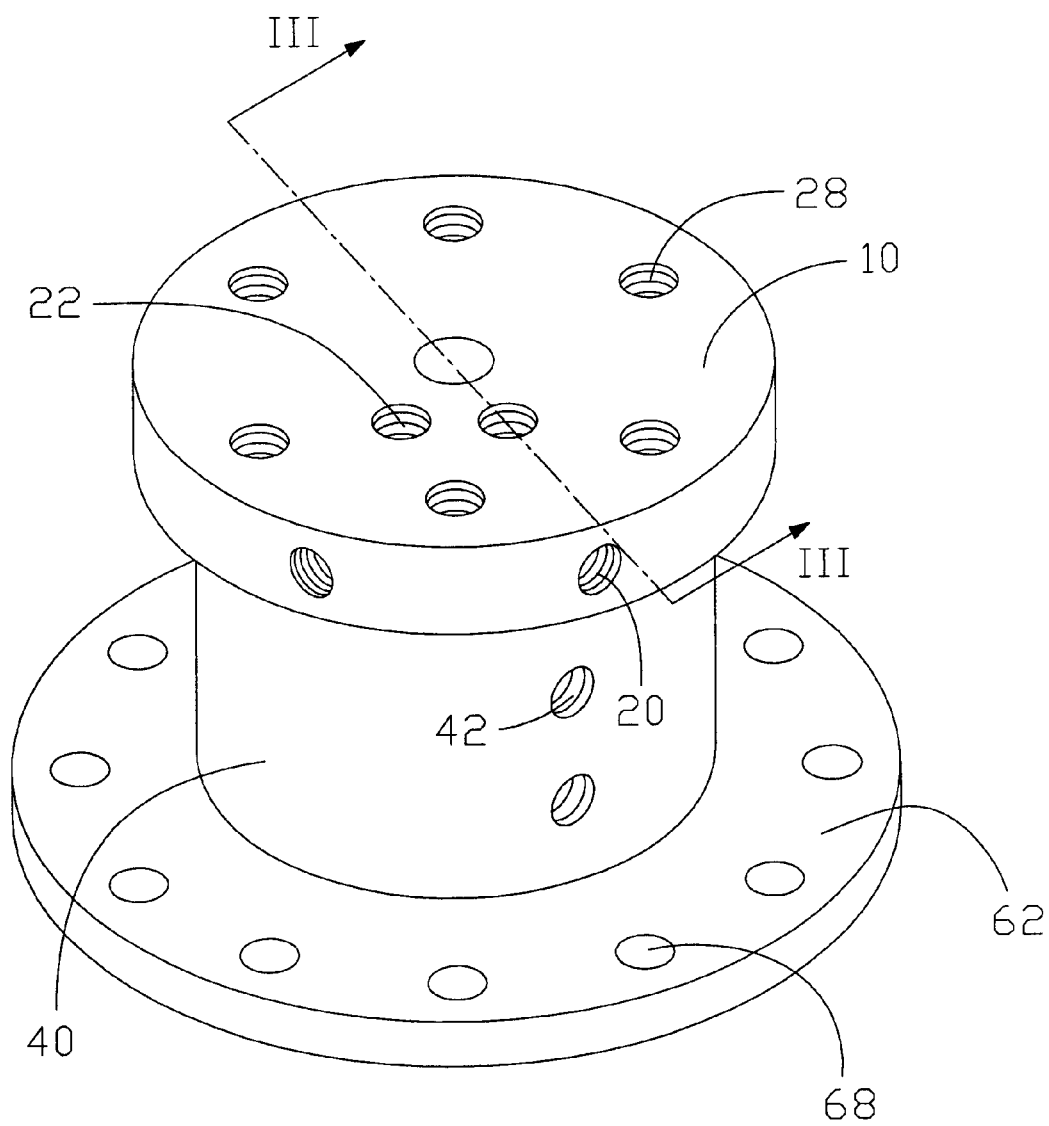
FIG. 2 is an assembled view of FIG. 1.
Figure 3:
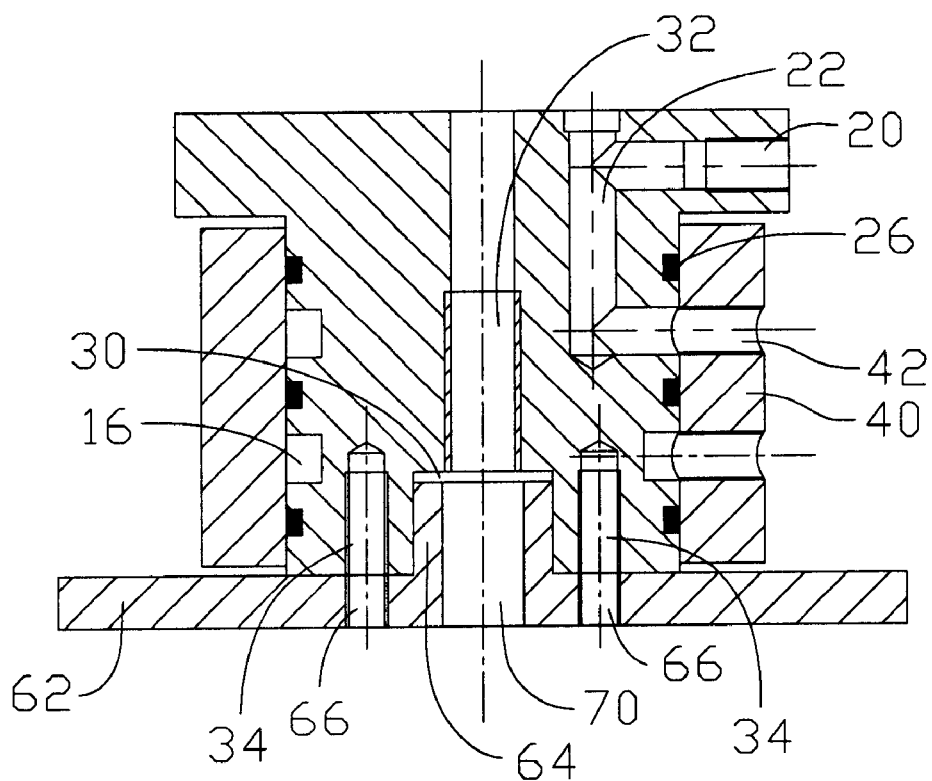
FIG. 3 is a cross-sectional view of FIG. 2, taken along line III—III.
Figure 4:
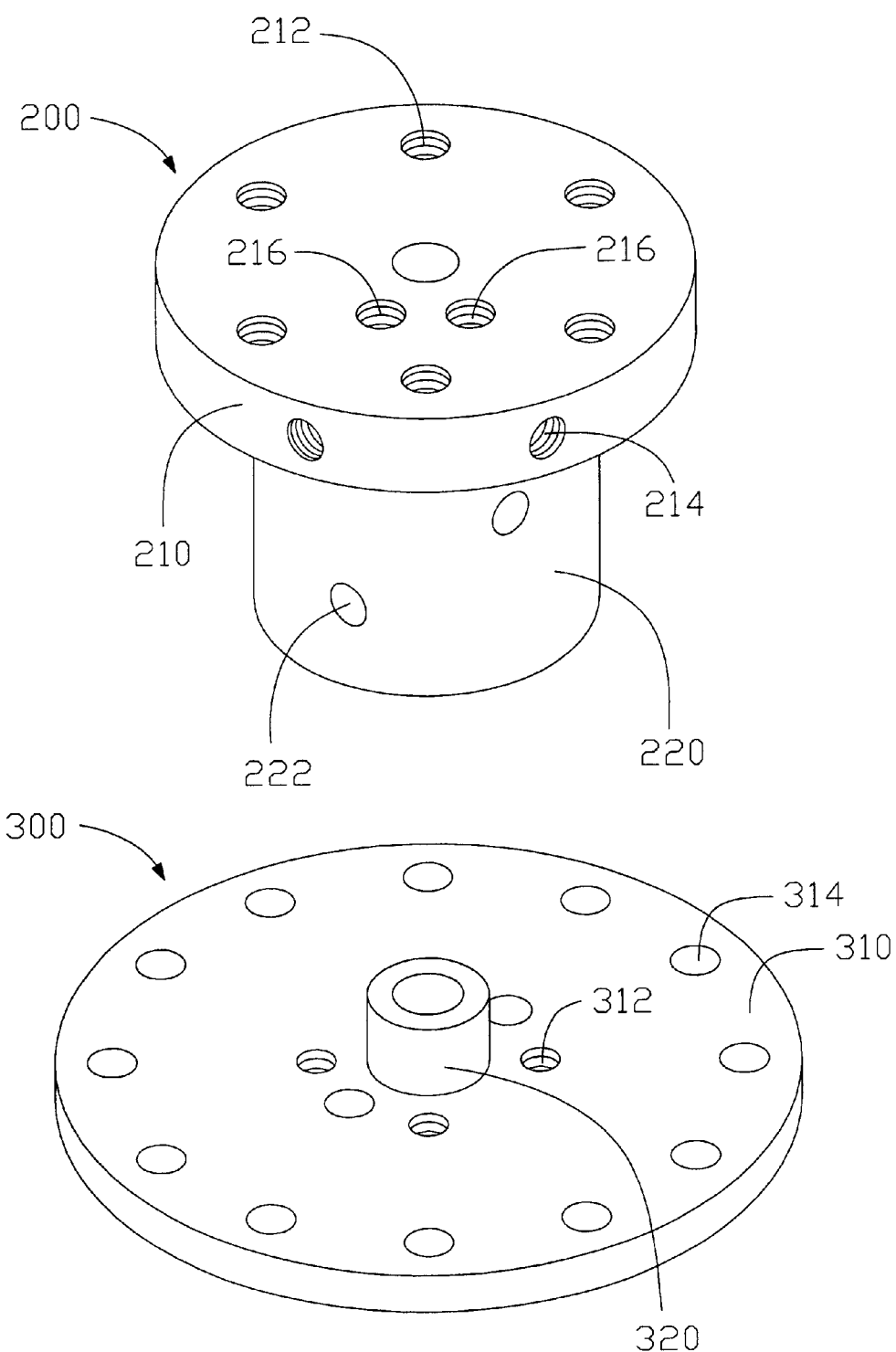
FIG. 4 is an exploded view of a conventional connector.

Referring to FIGS. 1–3, a connector in accordance with the present invention comprises a pivot portion 10, a sleeve 40 and a connect portion 60.

The pivot portion 10 comprises a cylindrical body 12 and a disc-shaped head 14. The body 12 depends from a center of the head 14, and is integrally formed with the head 14. A pair of parallel annular channels 16 is defined in an outer circumferential surface of the body 12. A through hole 18 is defined in the body 12 adjacent and in communication with each channel 16. Each through hole 18 extends radially inwardly toward a center of the body 12. Three annular grooves 24 are defined in the outer circumferential surface of the body 12. One of the grooves 24 is located above the channels 16, another of the grooves 24 is located between the channels 16, and another of the grooves 24 is located below the channels 16. A position hole 30 is defined in a center of a bottom surface of the body 12. A first screw hole 32 is defined in a center of the body 10. The first screw hole 32 is above, coaxial with, and in communication with the position hole 30. The first screw hole 32 has a diameter less than a diameter of the position hole 30. A plurality of second screw holes 34 is defined in the bottom surface of the body 12, surrounding the position hole 30.

Three elastic rings 26 are fitted in the grooves 24 of the body 12 of the pivot portion 10. The rings 26 provide an airtight engagement between the body 12 and the sleeve 40 once the body 12 and the sleeve 40 are assembled together.

The head 14 defines a pair of spaced outlets 20 in a circumferential surface thereof. A pair of spaced bores 22 is defined in an off-center portion of a top surface of the head 14. Each bore 22 is in communication with a corresponding through hole 18 and outlet 20. A plurality of third screw holes 28 is defined in the top surface of the head 14.

The sleeve 40 defines a plurality of inlets 42 in a circumferential surface thereof, corresponding to the channels 16 of the pivot portion 10.

The connect portion 60 comprises a base 62, and a cylindrical position section 64 extending upwardly from on a center of the base 62. A plurality of through apertures 66 is defined in the base 62, corresponding to the second screw holes 34 of the pivot portion 10. A plurality of locking holes 68 is defined in the base 60 near a circumferential periphery thereof. The locking holes 68 are evenly spaced apart. A through opening 70 is defined through the position section 64 and the base 60, corresponding to the first screw hole 32 of the pivot portion 10.

The immediate working environment of the connector of the present invention is as follows. A clamp (not shown) has a manipulator finger (not shown) engaged therein. Screws (not shown) extend from the clamp and engage in the third screw holes 28 of the head 14 of the pivot portion 10. The clamp is thus attached to the pivot portion 10. Pipes (not shown) are respectively connected to the sleeve 40 at the inlets 42, thereby enabling airflow to be received into the inlets 42. Pipes (not shown) respectively connect the head 14 of the pivot portion 10 at the outlets 20 to a sucking disc (not shown) of the manipulator finger. A pivot axle (not shown) of the manipulator has a faceplate at an end thereof. Screws (not shown) extend through the faceplate and into the locking holes 68 of the connect portion 60, thus engaging the connect portion 60 with the pivot axle.

In assembly of the connector of the present invention, the combined body 12 and rings 26 is inserted in the sleeve 40. A circumferential surface of the body 12 abuts against an inner circumferential surface of the sleeve 40. The rings 26 interferentially abut against the inner circumferential surface of the sleeve 40. The inlets 42 of the sleeve 40 are in communication with the corresponding channels 16 of the body 12. The combined pivot portion 10 and sleeve 40 is then attached to the connect portion 60. The position section 64 of the connect portion 60 is received in the position hole 30 of the pivot portion 10. Screws (not shown) are extended through the through apertures 66 of the connect portion 60 to engage in the second screw holes 34 of the pivot portion 10. A bolt (not shown) is extended through the through opening 70 of the connect portion 60 to engage in the first screw hole 32 of the pivot portion 10. The combined pivot portion 10, sleeve 40 and connect portion 60 is then attached to the pivot axle of the manipulator, by means of the connect portion 60 being engaged with the pivot axle. The sleeve 40 is fixedly attached to a part (not shown) of the manipulator which is fixed relative to the pivot axle of the manipulator, by means such as welding.

In the present invention, when the pivot portion 10 and the connect portion 60 are forced to pivot by action of the manipulator, the sleeve 40 remains stationary relative to the manipulator. The pipes connected to the inlets 42 of the sleeve 40 are thereby prevented from being twisted or distorted by the manipulator.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A connector adapted to be connected between a manipulator finger and a manipulator axle, the connector comprising:

a pivot portion adapted to be connected to the manipulator finger, the pivot portion comprising a body and a head, the body defining at least one channel and at least one through hole in communication with the at least one channel, the head defining at least one bore in communication with the at least one through hole;

a sleeve surrounding the body, the sleeve defining at least one inlet, the at least one inlet adapted to have a pipe connected thereat, the at least one inlet being in communication with the at least one channel; and a connect portion adapted to be connected to the manipulator axle and detachably attached to the pivot portion;

wherein the combination of the pivot portion and the connect portion is movable relative to the sleeve, wherein the pivot portion defines a position hole and a first screw hole in communication with the position hole, the first screw hole having a diameter less than a diameter of the position hole, wherein the connect portion comprises a base and a position section extending upwardly from a center of the base, the position section being received in the position hole of the pivot portion, wherein the pivot portion defines a plurality of second screw holes in a bottom surface thereof, and the base defines a plurality of through apertures for extension of screws therethrough to engage in the second screw holes.

2. The connector as claimed in claim 1, wherein the head defines at least one outlet, the at least one outlet being in communication with the at least one bore.

3. The connector as claimed in claim 2, wherein the at least one outlet extends radially inwardly toward a center of the head, and the at least one through bole extends radially inwardly toward a center of the body.

4. The connector as claimed in claim 1, wherein the at least one channel is annular, and is defined in a circumferential surface of the body.

5. The connector as claimed in claim 4, wherein the body defines a pair of parallel channels and a pair of through holes, each through hole being in communication with a corresponding channel, and wherein the head defines a pair of outlets and a pair of bores, each bore being in communication with a corresponding through hole and a corresponding outlet.

6. The connector as claimed in claim 5, wherein the body further defines three grooves for respectively receiving elastic rings therein to provide airtight engagement between the body and the sleeve, the grooves and the channels being alternately arranged.

7. The connector as claimed in claim 1, wherein the position section defines a through opening for extension of a screw therethrough to engage in the first screw hole of the pivot portion.

8. The connector as claimed in claim 1, wherein the base defines a plurality of locking holes for extension of screws therethrough to engage with the manipulator axle, thereby attaching the connect portion to the manipulator axle.

9. The connector as claimed in claim 1, wherein the head defines a plurality of screw holes, for extension therethrough of screws which extend from a clamp of the manipulator finger.

* * * * *